United States Patent [19]
Chang

[11] 3,895,148
[45] July 15, 1975

[54] PANEL EDGE CONFIGURATION

[76] Inventor: Ching-Yu Chang, 344 Audobon Rd., Englewood, N.J. 07631

[22] Filed: Oct. 12, 1973

[21] Appl. No.: 405,924

[52] U.S. Cl. ............ 428/81; 52/589; 52/592; 428/51; 428/157; 428/192
[51] Int. Cl.² .................. B32B 3/02; B32B 3/30
[58] Field of Search ......... 161/44, 149, 118, 36, 37, 161/41; 52/589, 592, 390; 35/72, 73

[56] References Cited
UNITED STATES PATENTS

| | | | |
|---|---|---|---|
| 2,187,672 | 1/1940 | Wedberg | 52/589 |
| 2,740,167 | 4/1956 | Rowley | 52/589 |
| 2,914,815 | 12/1959 | Alexander | 52/589 |
| 3,082,488 | 3/1963 | Nusbaum | 161/44 |
| 3,524,790 | 8/1970 | Mason | 161/44 |
| 3,613,326 | 10/1971 | Mollman | 52/589 |

*Primary Examiner*—George F. Lesmes
*Assistant Examiner*—William R. Dixon, Jr.
*Attorney, Agent, or Firm*—Howson and Howson

[57] ABSTRACT

A panel edge configuration for decorative or structural panels which permits adjacent identical rectangular panels to be joined in either a planar or a perpendicular arrangement. Each panel edge is characterized by notches of square cross-section which have a depth equal to one-half the thickness of the panel and which extend parallel to the edge in staggered relation along opposite sides of the edge.

5 Claims, 8 Drawing Figures

3,895,148

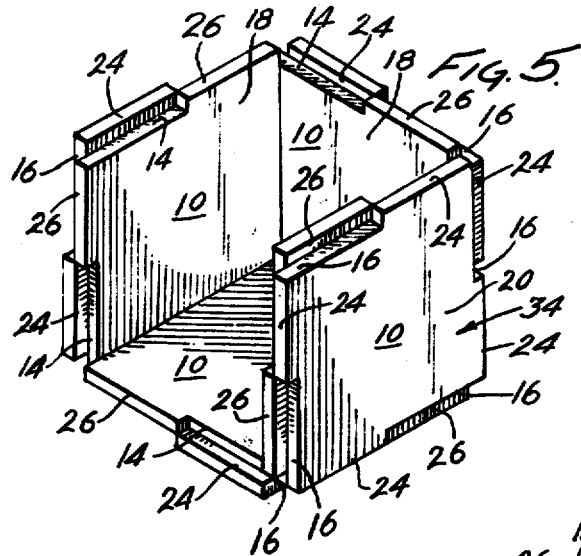
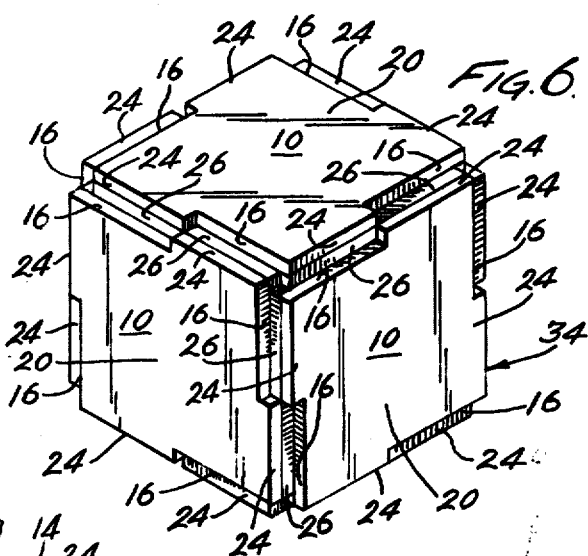
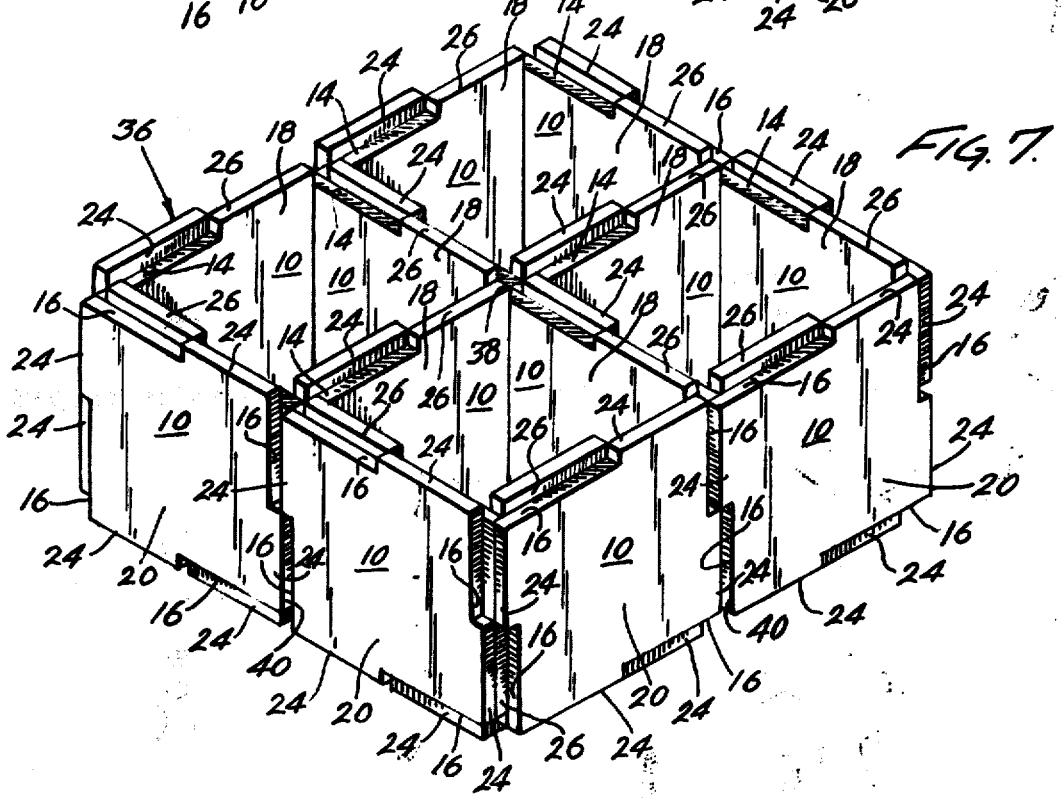
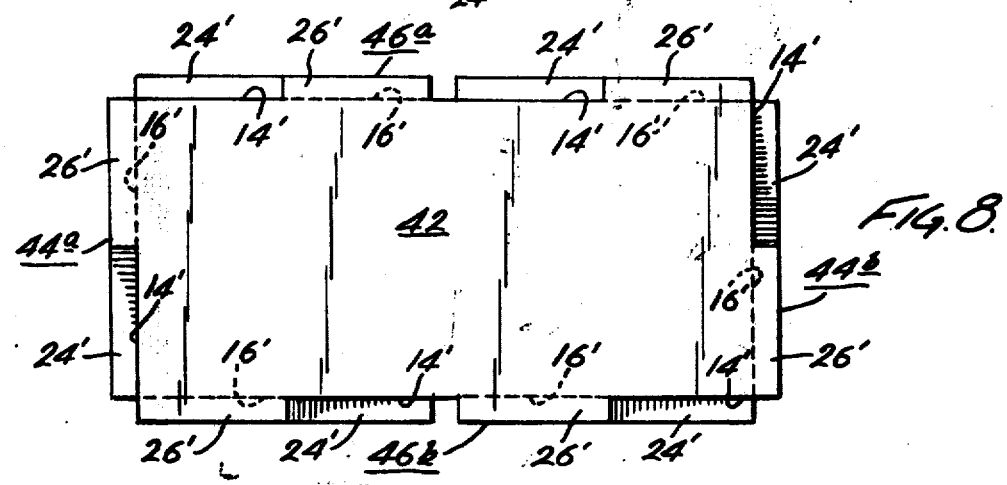

PANEL EDGE CONFIGURATION

The present invention relates generally to an arrangement for joining the edges of contiguous decorative or structural panels. In particular, the invention is directed to a novel panel edge configuration which is especially adapted for panels of substantial thickness and by means of which a plurality of identical panels can be joined to form either planar or three dimensional assemblies.

The present invention may be used for a wide variety of subjects ranging from children's construction type games to room divider panels and the like. It is especially suited for use with lightweight foam sandwich sheet materials or molded plastics.

An exceptional characteristic of the present invention is the ability of the edge configuration to mate with an edge of an identical panel either in a planar or a perpendicular fashion. Furthermore, the edge configuration permits the construction of three dimensional units since as many as four panel edges may cooperatively abut along the same juncture.

The present invention comprises a plurality of identical rectangular planar panel elements which preferably have a substantial thickness. Each panel edge is characterized by notches of square cross-section which have a depth equal to one-half the thickness of the panel and which extend parallel to the edge in staggered relation along opposite sides of the edge. Each notch forms an adjacent tongue portion of the panel edge which is also of a square cross-section and has a thickness equal to one-half the panel thickness. The tongue portions and notches are the same length and the tongue portions of a given panel will accordingly cooperatively interfit with the notches of adjacent panels either in a parallel or perpendicular disposition.

It is accordingly a first object of the present invention to provide a novel panel edge configuration for the assembly of identical decorative or structural panels.

A further object of the invention is to provide a panel edge configuration as described which permits the assembly of adjacent panels in either a parallel or perpendicular disposition.

Still another object of the invention is to provide a panel edge configuration as described which is particularly adapted for use with panels having a substantial thickness.

A still further object of the invention is to provide a panel edge configuration as described which permits the joining of as many as four panel edges along the same juncture.

Another object of the invention is to provide a panel edge configuration as described which is relatively simple and which can be economically fabricated.

Additional objects and advantages of the invention will be more readily apparent from the following detailed description of embodiments thereof when taken together with the accompanying drawings in which:

FIG. 5 is a perspective view of an incomplete cube-shaped panel assembly formed of panels of the type shown in FIG. 1;

FIG. 6 is a perspective view of a completed cube-shaped panel assembly formed of panels of the type shown in FIG. 1;

FIG. 7 is a perspective view of a further panel assembly formed of panels of the type shown in FIG. 1; and FIG. 8 is a plan view of a modified form of panel embodying an edge configuration in accordance with the present invention.

Figure 1:
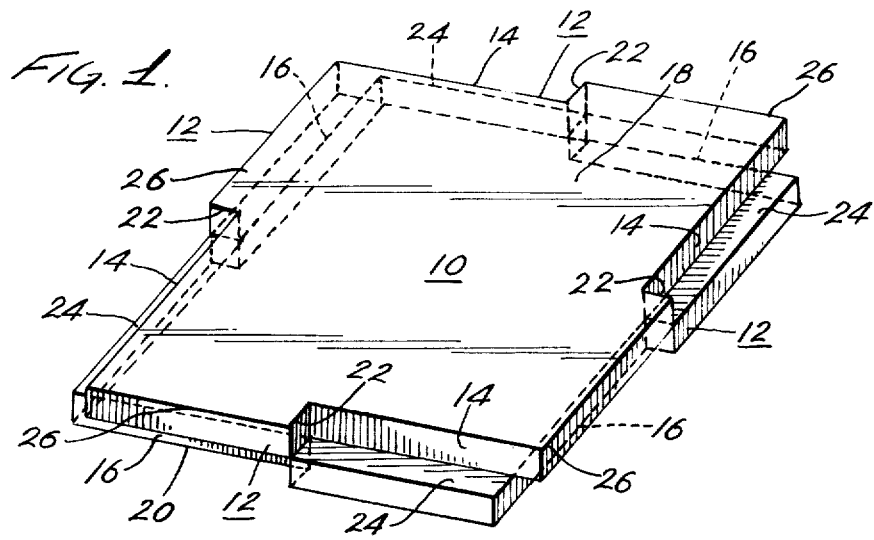
FIG. 1 is a perspective view of a panel having an edge configuration embodying the present invention.

Referring to the drawings and particularly FIG. 1 thereof, a flat panel generally designated 10 is shown having a novel edge configuration in accordance with the present invention. The panel 10, which preferably has a substantial thickness, is shown as a molded plastic material although it will be obvious that the invention could be effectively used with a variety of panel materials. The panel 10 has a square configuration although as indicated below, a rectangular panel shape other than a square can also be employed.

The four edges 12 of the panel are identically configured and each comprises notches 14 and 16 therein. The notches are each square in section, having a depth and width equal to one-half the thickness of the panel. In panel 10, the notches 14 and 16 each have a length equal to one-half the length of one of the panel edges 12 and are in opposed staggered relation, the notch 14 of each panel edge extending into the face 18 of the panel, while the notch 16 of each edge cuts into the opposite panel face 20. Each notch extends lengthwise along the panel edge from one end thereof to its midpoint 22, the notch 16 beginning where the notch 14 stops, but on the opposite side of the panel edge.

The notches in the panel edges produce tongue portions of the panel which as discussed below cooperate with the notches of adjoining panels. Each notch 14 forms an adjacent tongue portion 24, while each notch 16 forms an adjacent tongue portion 26. The tongue portions have a square cross-section which is the same size as the notches, having a thickness and width equal to one-half the panel thickness. The length of the tongue portions is substantially the same as that of the notches, one-half the length of the panel edges, although reduced by the width of the notch of the adjacent edge.

Figure 2:
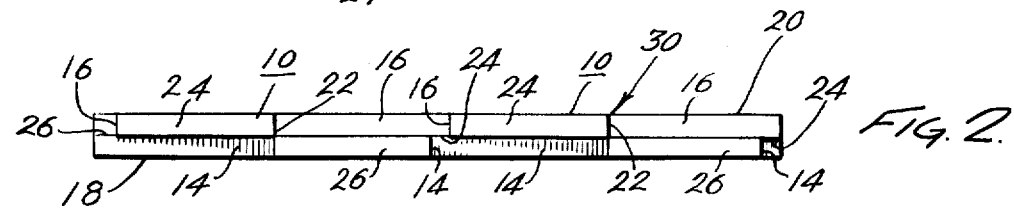
FIG. 2 is a side elevational view of a planar assembly of four panels of the type shown in FIG. 1.
Figure 3:
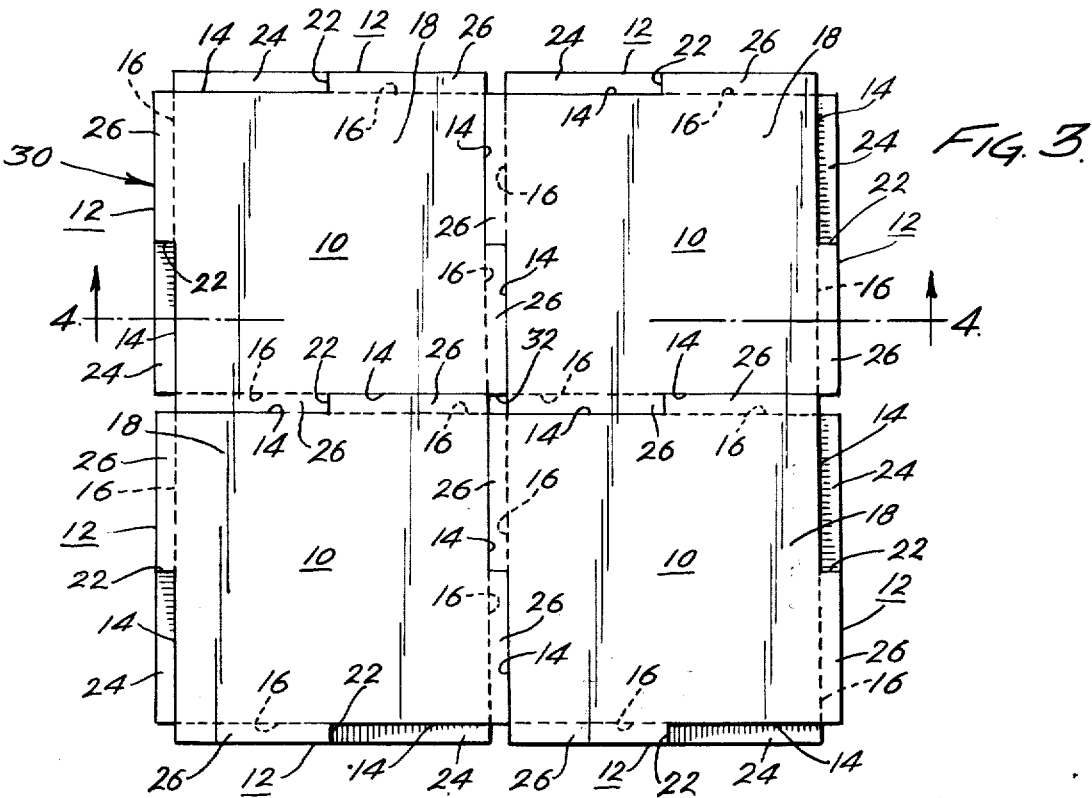
FIG. 3 is a plan view of the panel assembly shown in FIG. 2.
Figure 4:
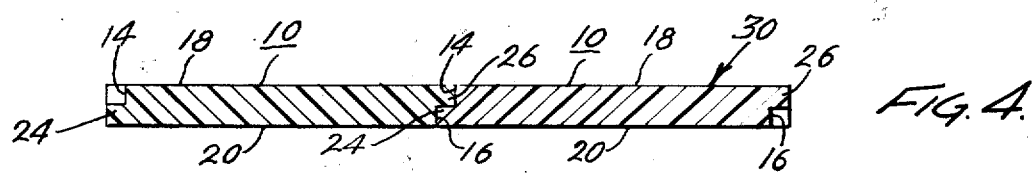
FIG. 4 is a sectional view taken along line 4—4 of FIG. 3.

The manner in which adjacent panel edges cooperate is illustrated in the panel assemblies of FIGS. 2–7. In FIGS. 2–4, a planar panel assembly 30 is formed of four of the identical panels 10. The tongue portions 24 fit into the notches 16 while the tongue portions 26 fit into the notches 14 to produce a flush surfaced assembly. A hole 32 in the center of the assembly is the only interruption of the smooth planar face of the assembly and can be plugged if objectionable. Any number of panels can be joined in the manner shown in FIGS. 2–4 to produce an assembly of the desired size and shape. Although the notches and tongues will secure the individual panels in position against dislodging forces perpendicular to the panel faces, some means such as an adhesive or fastenings (not shown) should be employed if the assembly is to be permanently joined.

A cube 34 assembled from six identical panels 10 is shown under construction in FIG. 5, and in its completed form in FIG. 6, and it can be seen that the tongues and grooves interfit in a perpendicular relation in the same manner as in the planar assembly of FIGS.

2-4, the tongues 24 interfitting into the notches 16, and the tongues 26 into the notches 14. It will furthermore be apparent that additional panels 10 can be added to all of the edges of the completed cube either parallel or perpendicular to the cube faces.

In FIG. 7, a larger assembly 36 is shown utilizing 16 identical panels 10. The assembly 36 illustrates the manner in which four of the panels 10 may cooperatively interfit along a common juncture 38. As can be seen from any edge of the cube of FIG. 6 or from the vertical corners of assembly 36, notches are exposed to receive an additional pair of panel edges. As shown at joints 40 of assembly 36 where three panels interfit, notches remain to receive the tongue portions of a fourth panel should the addition thereof be desired. It is accordingly possible to build upon an existing assembly in any direction parallel to or perpendicular to any of the assembly panels. As was the case with the assembly of FIGS. 2–4, the assemblies of FIGS. 5 and 6 and FIG. 7 should also be secured in a suitable manner (i.e., adhesives, fasteners, etc.) if permanence is desired.

In FIG. 8 a modified form of panel 42 is illustrated which is of an elongated rectangular configuration. In the panel 42, the shorter opposed edges 44a and 44b are identical with the edges 12 of the panel 10 previously described, each edge comprising a pair of notches 14' and 16' and a pair of tongue portions 24' and 26'. The longer edges 46a and 46b are twice the length of the edges 44a and 44b and accordingly each comprises two pairs of notches 14' and 16' and two pairs of tongue portions 24' and 26'. The panel 42 may thus be used in conjunction with identical panels or with the square panels 10, assuming the tongue and notches are of a compatible size.

It will accordingly be evident that any number of notches may be employed along a given panel edge although an even number of notches provides obvious advantages and permits assembly of the panels with either face out. The square panel configuration with an even number of notches in each edge is particularly preferred since each edge is identically configured regardless of the panel face in view.

Manifestly, changes in details of construction can be effected by those skilled in the art without departing from the spirit and the scope of the invention.

I claim:

1. A panel having at least one edge adapted for cooperative engagement with an identical edge of another panel, said panel edge comprising a plurality of notches each having a square cross-section, the depth and width of each said notch being equal to one-half the thickness of said panel, said notches extending parallel to the edge in staggered relation along opposite sides of the edge, said notches being of substantially equal length, tongue portions of the panel formed by said notches and having a square cross-section equal to that of said notches, the tongue portions of said edge being adapted to fit into the notches of an identical panel edge and the notches of said edge being adapted to receive the tongue portions of an identical edge in either a planar or perpendicular engagement of the panels.

2. The invention claimed in claim 1 wherein the length of each said notch is equal to one-half the length of said panel edge.

3. A rectangular planar panel having a configuration of each of the edges thereof adapted to cooperatively engage an identical edge of a similar panel, each said panel edge comprising a plurality of notches each having a square cross-section, the depth and width of each said notch being equal to one-half the thickness of said panel, said notches extending parallel to the edge in staggered relation along opposite sides of the edge, said notches being of substantially equal length, tongue portions of the panel formed by said notches and having a square cross-section equal to that of said notches, the tongue portions of each said edge being adapted to fit into the notches of an identical panel edge and the notches of said edge being adapted to receive the tongue portions of an identical edge in either a planar or perpendicular engagement of the panels.

4. The invention claimed in claim 3 wherein said panel has a square configuration.

5. The invention claimed in claim 4 wherein the length of each said notch is equal to one-half the length of said panel edge.

* * * * *